(12) United States Patent  (10) Patent No.: US 6,457,724 B2
Ogaeri et al.                 (45) Date of Patent:    Oct. 1, 2002

(54) METALLIC GASKET

(75) Inventors: Tomoyoshi Ogaeri; Yutaka Furuta; Koichi Nakazato, all of Higashiosaka (JP)

(73) Assignee: Nippon Gasket Company Ltd., Osaka (JP)

(*) Notice: Subject to any disclaimer, the term of this patent is extended or adjusted under 35 U.S.C. 154(b) by 16 days.

(21) Appl. No.: 09/733,908

(22) Filed: Dec. 12, 2000

(30) Foreign Application Priority Data

Dec. 15, 1999 (JP) .......................................... 11-355812

(51) Int. Cl.⁷ .............................................. F02F 11/00
(52) U.S. Cl. ........................ 277/595; 277/591; 277/594
(58) Field of Search ................................ 277/591, 594, 277/595, 600, 601

(56) References Cited

U.S. PATENT DOCUMENTS

| | | | | |
|---|---|---|---|---|
| 4,254,963 A | * | 3/1981 | Skrycki | 277/592 |
| 4,285,527 A | * | 8/1981 | Connely | 277/595 |
| 4,311,318 A | * | 1/1982 | Czernik et al. | 277/598 |
| 4,400,000 A | * | 8/1983 | Moerk, Jr. | 277/598 |
| 4,518,168 A | * | 5/1985 | Belter | 277/601 |
| 4,714,062 A | * | 12/1987 | Toeda | 123/270 |
| 4,756,537 A | * | 7/1988 | Beyer et al. | 277/601 |
| 4,799,695 A | * | 1/1989 | Yoshino | 277/591 |
| 5,520,148 A | * | 5/1996 | Kawamura et al. | 123/254 |
| 5,584,490 A | * | 12/1996 | Inoue et al. | 277/595 |
| 5,664,540 A | * | 9/1997 | Matsuoka et al. | 123/254 |
| 6,164,662 A | * | 12/2000 | Uemura et al. | 277/593 |
| 6,315,303 B1 | * | 11/2001 | Erb et al. | 277/593 |

FOREIGN PATENT DOCUMENTS

| | | |
|---|---|---|
| GB | 2314386 A | 12/1997 |
| JP | 62155376 A | 7/1987 |
| JP | 2-83356 | 6/1990 |
| JP | 06337069 A | 12/1994 |
| JP | 08-042697 | 2/1996 |
| JP | 08-042698 | 2/1996 |
| JP | 08-200503 | 8/1996 |
| JP | 09-196178 | 7/1997 |
| JP | 10-009392 | 1/1998 |
| JP | 2575037 | 4/1998 |

* cited by examiner

Primary Examiner—Anthony Knight
Assistant Examiner—Enoch E Peavey
(74) Attorney, Agent, or Firm—Rader, Fishman & Grauer, PLLC

(57) ABSTRACT

With the objective of providing a metallic gasket which can realize both sealing performance and cost reduction which can be achieved by the decreased number of constituting plates or the decreased number of materials, the metallic gasket is composed of: a first bead plate which is made of elastic metal and has hot plug beads which are respectively formed opposite hot plugs; and a second bead plate which is made of elastic metal and has folded parts each of which is formed about the periphery of a bore hole and annular bore beads each of which is formed about the periphery of an area including the bore hole and a portion which is opposite to the hot plug.

11 Claims, 10 Drawing Sheets

(a)

(b)

(c)

(d)

(a)

(b)

(a)

(b)

METALLIC GASKET

TECHNICAL FIELD

The present invention relates to a metallic gasket and, more particularly, to a metallic gasket for use in an indirect engine in which hot plugs are fitted in the lower portion of a cylinder head.

BACKGROUND ART

An indirect engine, an indirect diesel engine in particular, comprises main combustion chambers (main chambers) and subsidiary combustion chambers (subsidiary chambers) each of which communicates with each of the main combustion chambers through a throttle. Fuel gas which is subjected to primary combustion and incomplete mixture in the subsidiary combustion chamber are made to pass through the throttle, are jetted into the main combustion chamber, and are then well mixed with air, which is present in the main combustion chamber, by jet energy, which occurs when they pass through the throttle, so as to be subjected to complete combustion. Since a structure in which hot plugs are fitted in a cylinder head is adopted in this indirect diesel engine, a step is formed between the bottom face of each of the hot plugs and the bottom face of the cylinder head. In cases where the bottom face of each hot plug is convex, stress concentrates on a bead plate (bead plates) and the others, which situation, in combination with thermal stress resulting from a high-temperature portion which is opposite to each hot plug, easily causes cracks in the periphery of each combustion chamber, which periphery includes the bead plate(s) and the others, and therefore there has been a problem of securing sealability.

For the purpose of coping with such problems, various types of gaskets, each of which is composed of four plates, namely, two bead plates and two intermediate plates held between those two bead plates, have been proposed as layered metallic gaskets for use in the indirect engines in particular.

For example, a metallic layered head gasket is disclosed in Japanese Utility Model Laid-Open Publication No. 6-24268 (1994) according to which, two intermediate plates, namely, an upper adjusting plate and a lower adjusting plate, are laminated between a first bead plate and a second bead plate, and the upper adjusting plate is folded over at the peripheral edge of each combustion chamber hole and at the peripheral edge of each cut-out hole, thereby forming overlap-folded edge parts (closely-folded parts). Moreover, a gasket in which a metallic shim plate or a soft member is sandwiched for reinforcement of each portion which is opposite to the hot plug and the others is disclosed in Japanese Utility Model No. 2575037, Japanese Patent Laid-Open Publication No. 8-42697 (1996), Japanese Patent Laid-Open Publication No. 8-42698 (1996) or the others.

Recently, in tandem with movement toward weight reduction which can be achieved by what is called conversion to all aluminum and higher combustion pressure for the engine, from the viewpoint of cost, a gasket which is composed of three plates is demanded for use in this type of indirect diesel engine. One example of a cylinder head gasket composed of three plates is disclosed in Japanese Utility Model Laid-Open Publication No. 2-83356 (1990) according to which, grommets are used in conjunction with wire rings. Another example is disclosed in Japanese Patent Laid-Open Publication No. 6-337069 (1994) according to which, a shim ring is formed about the periphery of each bore hole to constitute a stopper part, and a bead plate having annular beads is formed with presser beads which are respectively formed opposite the hot plugs.

Moreover, as prior arts that is relevant to the present invention, Japanese Patent Laid-Open Publication No. 9-196178 (1997) and Japanese Patent Laid-Open Publication No. 10-9392 (1998), which are proposed by the present applicant(s), each disclose a layered gasket composed of three plates. According to each of these prior arts, a thick intermediate plate provided with beads or beaded stoppers is held by a thin bead plate.

The foregoing conventional gaskets each of which is composed of four plates, however, reveal the following problem. Since one of the intermediate plates is formed with the closely-folded parts which are being folded at an angle of 180° and serve as stopper parts, usable material is usually limited to, for example, a low elastic metal plate such as SUS304 or the like, from the viewpoint of prevention of cracks which occur during a bending operation carried out for formation of these folded parts. For this reason, although a stopper function can be imparted to this type of intermediate plate, it is difficult to impart a bead plate function thereto for sealing.

Moreover, according to the foregoing conventional structures, either the thick intermediate plate, or the thick adjusting plate, or both in a laminated condition are interposed between the two bead plates, so that sealing surface pressure of each of the bead plates does not reach the opposite side of the thick plate or the laminated plates at all. In other words, owing to these thick plates or the laminated plates, a sealing function is divided, and a sealing effect problematically declines. Furthermore, in the case of the gasket having the metallic shim plates each of which is used for reinforcement of the portion which is opposite to the hot plug and the others, strength of each shim plate becomes excessively high, and variation of the step of the bottom face of each hot plug is poorly absorbed. In the case of the gasket having the soft members, the soft members are problematically low in strength. Either of these cases has a problem that the number of materials as well as the number of man-hours to perform installation and to check whether there is no slipups in the installation increase.

Similarly to the gasket having the metallic shim plates and the gasket having the soft members, the foregoing gasket which is composed of three plates and has the wire rings and the others has a problem that the number of materials and the number of man-hours increase. Moreover, in the case of the gasket having the hot plug presser beads which are formed on the bead plate, it is difficult to secure strength of the presser beads, and even when their strength is increased, stress adversely concentrates on the presser beads per se and the bead plate which become cracked or deformed as a result.

In the case of those gaskets which are disclosed in Japanese Patent Laid-Open Publication No. 9-196178 (1997) and Japanese Patent Laid-Open Publication No. 10-9392 (1998) as being relevant to the present invention, each bead or each beaded stopper is simply formed about the periphery of the bore hole in the annular form, with no consideration given to reinforcement of each portion which is opposite to the hot plug of the indirect engine.

The present invention addresses the problems discussed above and aims to provide a metallic gasket which is suitable for use in an indirect engine, the metallic gasket realizing both sealing performance and cost reduction which can be achieved by the decreased number of constituting plates or the decreased number of materials.

SUMMARY OF THE INVENTION

The present invention is based on a finding that with the use of either a low elastic spring material or a material having good cold workability, heat resistance and high strength, even in cases where no stopper is provided, bore beads formed on such a material are hardly susceptible to high stress amplitude and high stress concentration which cause bead cracks and setting, and with the use of such a material as a second bead plate on which folded parts and the bore beads are formed, a desired sealing function can be obtained without the need to increase the number of plates to be laminated.

A metallic gasket according to the present invention is used in an indirect engine in which hot plugs are fitted in the lower portion of a cylinder head and comprises:

(a) a first bead plate being made of elastic metal and comprising hot plug beads which are respectively formed opposite the hot plugs; and (b) a second bead plate being made of elastic metal and comprising folded parts each of which is formed about the periphery of a bore hole, and annular bore beads each of which is formed about the periphery of an area including the bore hole and a portion which is opposite to the hot plug.

According to the present invention, the first bead plate is formed with the hot plug beads, and therefore each hot plug bead supports the hot plug, and load is prevented from concentrating locally on each primary gas sealing-out portion which is also prevented from becoming deformed and cracked. Moreover, each hot plug is prevented from falling. Since the first bead plate is not a complete rigid body, it functions as a margin for absorbing stress, which results from a step of the bottom face of each hot plug and variation of the step, and functions as a thickness adjusting plate. On the other hand, the second bead plate is appropriately formed with the folded parts, and therefore the increased thickness can be provided for the periphery of each bore hole, and in cases where the metallic gasket is composed of three plates, each folded part serves as a stopper with respect to each bore bead formed on a third bead plate. Moreover, each bore bead formed on the second bead plate is an annular bead which is formed about the periphery of an area including the bore hole and the portion which is opposite to the hot plug, so that a clearance caused by the step which is formed between the bottom face of each hot plug and the bottom face of the cylinder head is not made on a seal line of each annular bore bead. In other words, the periphery of each bore hole can be sealed without fail.

In the present invention, it is preferable that the first bead plate end portions which respectively face the bore holes are respectively held by the folded parts formed on the second bead plate. Thus, with the thickness of the thin second bead plate or with the thickness which is smaller than the thickness of the second bead plate, the stopper amount which is a little smaller than the height of the hot plug bead can be secured, and load occurring for the time during which the gasket is clamped between the cylinder head and a cylinder block can be appropriately concentrated on each folded part, so that appropriate high surface pressure occurs on each portion which is close to the bore hole. In addition, the first bead plate end portions which respectively face the bore holes are respectively protected from the high-temperature hot plugs by being respectively held by the folded parts, so that cracks resulting from thermal stress are prevented from occurring in each end portion which faces the bore hole.

It is preferable that corner portions of each of the first bead plate end portions held by the second bead plate, which corner portions extend along the periphery of the bore hole, are chamfered. Thus, cracks resulting from high temperature stress can be prevented from occurring in folded round parts of the second bead plate. It should be noted that the chamfering can be carried out separately from or together with the folding operation.

In the present invention, the first bead plate and the second bead plate can also be laminated in such a manner that the first bead plate end portions which respectively face the bore holes are not respectively held by the folded parts formed on the second bead plate, while the inner side of each of the folded parts is provided with a clearance. In this case, curved parts are preferably prevented from cracking, and the clearances are preferably maintained even after the thus-configured gasket is clamped between the cylinder head and the cylinder block.

With consideration given to both prevention of cracks in the folded round parts and maintenance of bead elasticity, it is better that the second bead plate be made from a spring material having cold workability.

In the present invention, it is preferable that a third bead plate which is made of elastic metal and comprises bore beads is laminated on the first bead plate. Compared with the gasket composed of two plates, this decreases the number of leakage paths between layers, so that improved sealing reliability can be obtained. Moreover, the thickness of the first bead plate is appropriately set, so that if a thick intermediate plate and/or a thick adjusting plate is not interposed between the second bead plate and the third bead plate, sealing surface pressure of each of the second and third bead plates reaches the opposite side of the first bead plate across the first bead plate. In other words, owing to the first bead plate interposed between the second and third bead plates, sealing surface pressure of each of the second and third bead plates is not divided, so that a good sealing effect can be achieved. Furthermore, with the adoption of a structure in which the first bead plate end portions which respectively face the bore holes are respectively held by the folded parts of the second bead plate, the gasket composed of such three plates can have excellent heat resistance and excellent crack resistance about the respective peripheries of the bore holes. This effect is brought to the fore particularly when the second bead plate formed with the folded parts is made from austenitic high manganese stainless steel.

Here, it is better for the first bead plate to have an appropriate thickness which is basically greater than those of the second bead plate and the third bead plate. Thus, the first bead plate becomes a constituting plate having strength and cold workability and therefore can minimize cracks and deformation. It should be noted that the third bead plate is preferably made from a spring material.

Each hot plug bead formed on the first bead plate comes in various shapes such as convex beads, half beads, stepped beads and the others. Specifically, each hot plug bead is shaped into linear beads which are arranged in parallel relation, elliptical beads which are arranged in parallel relation, double half beads or plural beads in the form of small projections. The shape, the height and the overall structure of each hot plug bead can be selected in an appropriate manner in accordance with the step formed between the sealing contact face and the bottom face of the hot plug, required stress dispersion, required surface pressure and the others. It should be noted that with consideration given to the simple shape, easy working, effects and the others, each hot plug bead is most preferably shaped into a convex bead which is crescent-shaped in a plan view.

DESCRIPTION OF THE PREFERRED EMBODIMENTS

Preferred embodiments of the present invention are concretely demonstrated hereinafter with reference to the accompanying drawings.

Figure 1:
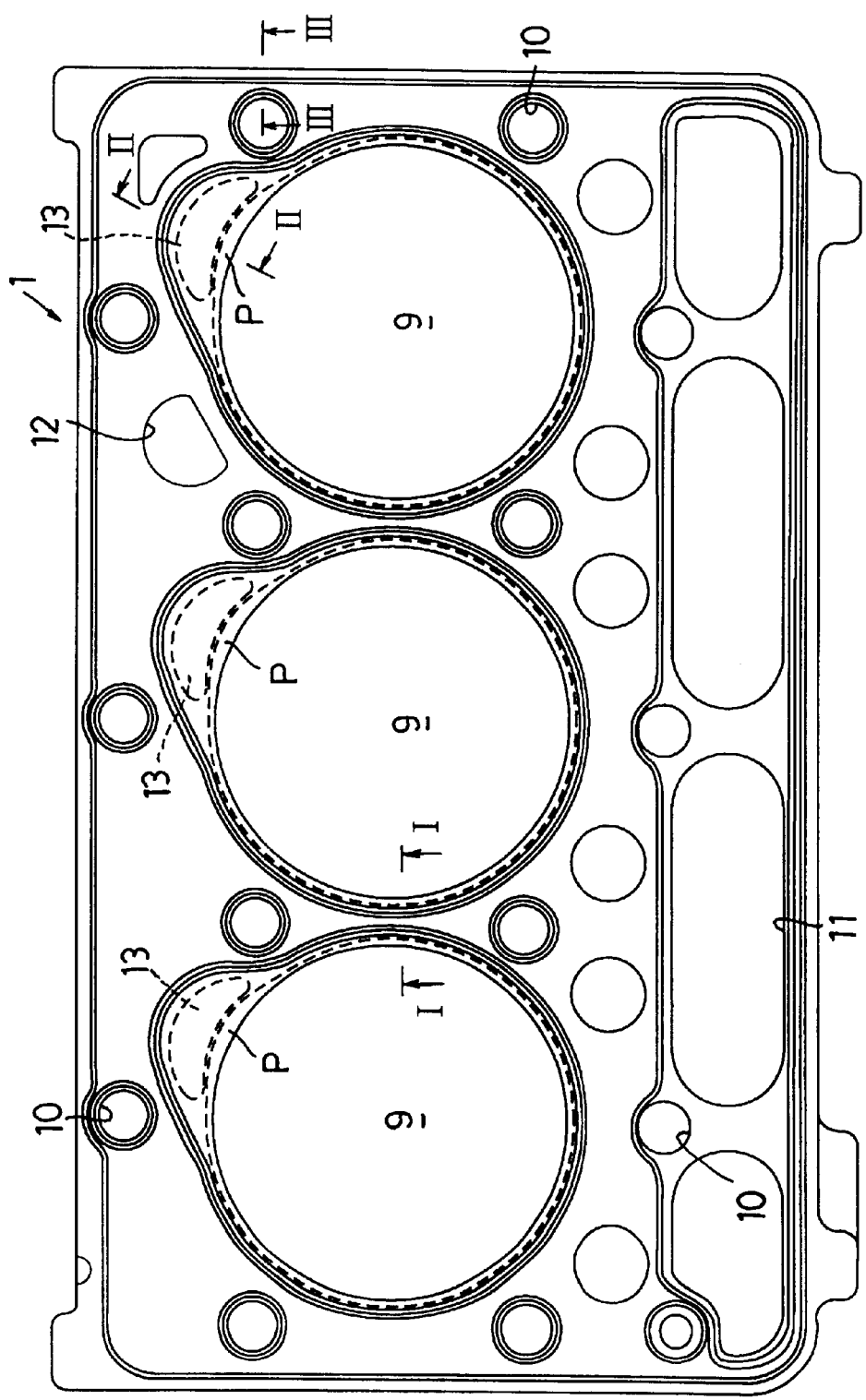
FIG. 1 is a plan view of a metallic gasket in accordance with one embodiment of the present invention.
Figure 2:
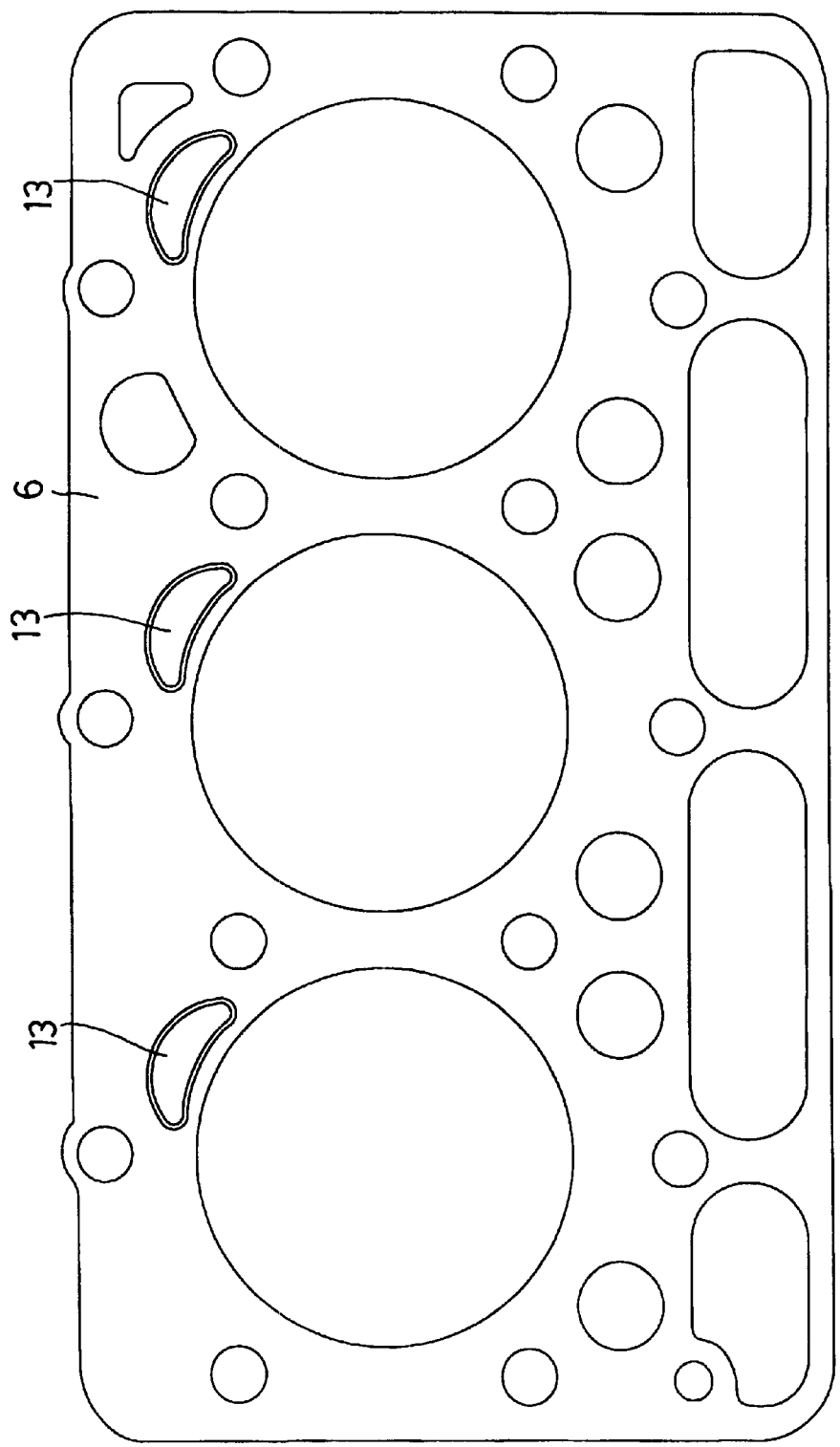
FIG. 2 is plan view of a first bead plate of the metallic gasket in accordance with the embodiment.
Figure 3:
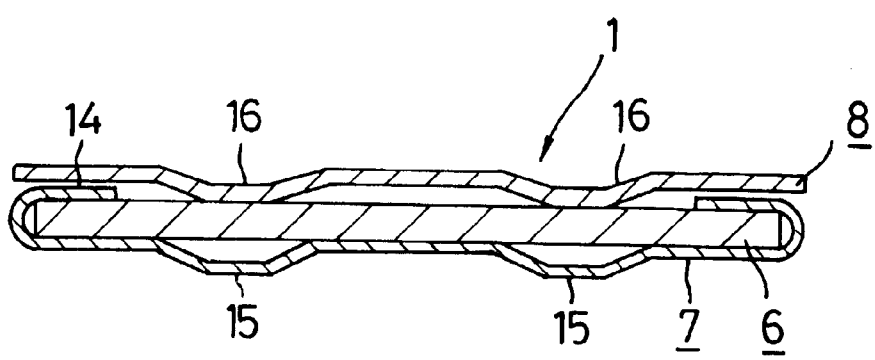
FIG. 3 is a sectional view taken along line I—I of FIG. 1.
Figure 4:
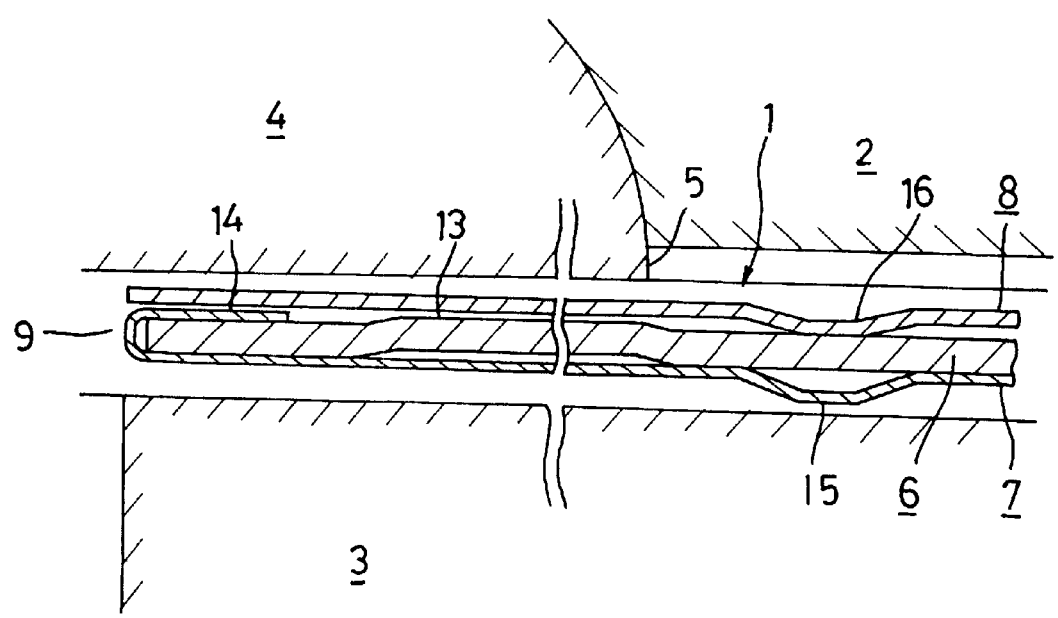
FIG. 4 is a sectional view taken along line II—II of FIG. 1.
Figure 5:
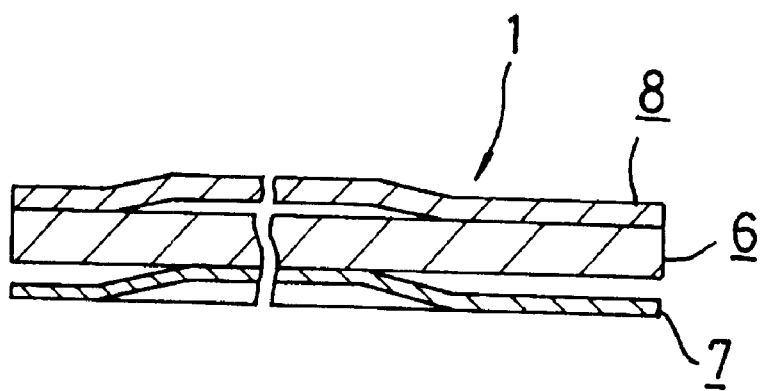
FIG. 5 is a sectional view taken along line III—III of FIG. 1.

FIG. 1 is a plan view of a metallic gasket in accordance with one embodiment of the present invention, and FIG. 2 is plan view of a first bead plate of the same. Moreover, FIGS. 3, 4 and 5 are sectional views taken along lines I—I, II—II, and III—III of FIG. 1, respectively.

In an indirect multiple-cylinder engine, a metallic gasket 1 in accordance with the present embodiment is inserted between the respective opposed faces of a cylinder head 2 and a cylinder block 3. As shown in FIG. 4, hot plugs 4 which are made separately from the cylinder head 2 to constitute subsidiary combustion chambers (subsidiary chambers) are positioned so as to respectively fit in cavities defined in the cylinder head 2. Generally, each hot plug 4 protrudes slightly from, or is slightly depressed relative to the bottom face of the cylinder head 2, forming a step 5. FIG. 4 shows one of the hot plugs 4 protruding slightly from the bottom face of the cylinder head 2.

The metallic gasket 1 is composed of three plates, namely, a first bead plate 6 which is made of elastic metal and has a required thickness, a second bead plate 7 which is made of elastic metal and has a thickness that is smaller than that of the first bead plate 6 and a third bead plate 8 which is made of elastic metal and has a thickness that is smaller than that of the first bead plate 6. The second bead plate 7 and the third bead plate 8 are laminated so as to face each other across the first bead plate 6. In the present embodiment, the ranking of these bead plates, from thickest to thinnest, is the first bead plate 6, the third bead plate 8 and the second bead plate 7. Depending on the situation, each of these constituting plates can be partially or entirely subjected to various kinds of surface coatings (not illustrated in the drawing).

Each of the bead plates 6, 7, 8 has bore holes 9 which are positioned in registration with a plurality of cylinder bores arranged in a row in the cylinder block 3 and has bolt holes 10, oil holes 11, water holes 12 and the others. As a general rule, the bolt holes 10, the oil holes 11 and the water holes 12 are respectively encircled by half beads in various manners, and the gasket 1 is also encircled by a half bead.

The first bead plate 6 is formed with hot plug beads 13 which are respectively formed opposite the hot plugs 4. Each hot plug bead 13 is crescent-shaped in a plan view and is shaped into a convexity whose surface is flat. Each hot plug bead 13 helps to support the hot plug 4, helps to prevent load from concentrating locally on a primary gas sealing-out portion, helps to prevent the primary gas sealing-out portion from becoming deformed and cracked and helps to prevent the hot plug 4 from falling. The first bead plate 6 is a constituting plate which is relatively thick and has strength and cold workability, so that cracks and deformation hardly occur. Moreover, the first bead plate 6 is not a complete rigid body, and therefore while maintaining its strength, it functions as a margin for absorbing stress, which results from the step of the bottom face of each hot plug 4 and variation of the step, and functions as a thickness adjusting plate. It should be noted that each hot plug bead 13 also has the function of supporting the movement of the hot plug 4 per se when the hot plug 4 is loosely fitted in the cavity.

The second bead plate 7 has folded parts 14 each of which is formed about the periphery of the bore hole 9 and annular bore beads 15 each of which is formed about the periphery of an area including the bore hole 9 and a portion which is opposite to the hot plug 4, and the folded parts 14 respectively hold end portions of the first bead plate 6, which end portions respectively face the bore holes 9. Each folded part 14 of the second bead plate 7 functions as a stopper part with respect to each bore bead 16 (will be described later) of the third bead plate 8. Here, each folded part 14 is formed in such a manner that its width is gradually changed to become greater toward a portion (a portion indicated by letter P of FIG. 1) which is opposite to the hot plug 4 from the other portion. Thus, in cases where the step is present, causing the convex bottom face of the hot plug 4, surface pressure occurring on the stopper part can be dispersed, so that deformation of and cracks in the folded part 14 can be restricted. On the other hand, each bore bead 15 is intended for bore sealing and is formed into an annular shape enclosing the area including the bore hole 9 and the portion which is opposite to the hot plug 4, so that a clearance caused by the step of each hot plug 4 is not made on a seal line of each annular bore bead 15.

Similarly to the second bead plate 7, the third bead plate 8 has annular bore beads 16 each of which is formed about the periphery of an area including the bore hole 9 and the hot plug 4. Each bore bead 16 is intended for bore sealing. In the present embodiment, each bore bead of the second bead plate 7 has the same shape as each bore bead of the third bead plate 8, so that die sharing is feasible, whereby working can be performed more easily.

In the metallic gasket 1 in accordance with the present embodiment, the folded parts 14, the bore beads 15 and the bore beads 16 each constitute a seal portion. Each folded part 14 allows load, which occurs for the time during which the gasket 1 is clamped between the cylinder head 2 and the cylinder block 3, to appropriately concentrate thereon, thereby helping to cause appropriate high surface pressure on a portion which is close to the bore hole. Moreover, each folded part 14 functions as the stopper part with respect to each bore bead 16 of the third bead plate 8. Accordingly, the height H (see FIG. 8) of each hot plug bead 13 is always set smaller than the stopper amount S (see FIG. 8) of each folded part 14 so that it will not interfere with a primary gas sealing-out function of each folded part 14. This stopper amount S is set smaller than the height of each bore bead 16 of the third bead plate 8 to allow each bore bead 16 to exert its stopper effect. In this way, primary sealing and secondary sealing are performed at the same time by each folded part 14 and each bore bead 16 of the third bead plate 8, respectively.

The first bead plate 6 is made from a material selected from the group consisting of SECC and SUS430. The second bead plate 7 is made from a material selected from the group consisting of austenitic high manganese stainless steel, SUS304 and SUS301 which is less than ¾ hard in hardness (a soft, heat-treated spring material). The third bead plate 8 is made from a material selected from the group consisting of full hard SUS301 (hard, heat-treated spring materials) and ¾ hard SUS301. It is preferable that the second bead plate 7 which is made from austenitic high manganese stainless steel having heat resistance, high strength and good cold workability is used in combination with the third bead plate 8 which is made from full hard SUS301. With this combined use, the end portions of the first bead plate 6, which end portions respectively face the bore holes 9, are respectively protected from the high-temperature hot plugs 4 by being respectively held by the folded parts 14 of the second bead plate 7, so that cracks resulting from thermal stress are prevented from occurring in those end portions. In other words, even if the first bead plate 6 is made from ordinary steel, that is, SECC, each end portion facing the bore hole 9 is held and protected by the folded part 14 of the second bead plate 7 which is made from stainless steel having heat resistance and high strength, so that each end portion obtains improved durability. In the case of the above-mentioned combination, if the first bead plate 6 is made from SUS430, the foregoing effect can be enhanced to a larger extent.

With the appropriate setting of the thickness of the first bead plate 6, if a thick intermediate plate and/or a thick adjusting plate is not interposed between the second bead plate 7 and the third bead plate 8, sealing surface pressure of each of the second and third bead plates 7, 8 reaches the opposite side of the first bead plate 6 across the first bead plate 6. In other words, owing to the first bead plate interposed between the second and third bead plates, sealing surface pressure of each of the second and third bead plates is not divided, so that a good sealing effect can be achieved. The metallic gasket 1 in accordance with the present embodiment therefore has not only the effect of preventing cracks from occurring in the first bead plate end portions which respectively face the bore holes 9, but also the good sealing effect as mentioned above.

In the present embodiment, each bore bead of the second bead plate 7 and each bore bead of the third bead plate 8 may be shaped into full beads or half beads. Moreover, they may be angle-shaped or trapezoidal. Most preferably, they each have the shape of a full bead (consisting of two closely-arranged half beads) which is trapezoidal in section. One reason for this is that multiple sealing relative to the cylinder head 2 and the cylinder block 3 can be achieved by a twofold seal line formed by each bore bead of the second bead plate 7 and each bore bead of the third bead plate 8. Another reason is that the full bead has excellent resilience and good followability with respect to the movement of each of the respective sealing contact faces of the cylinder head 2 and the cylinder block 3.

It is better that the width of each bore bead positioned, away from the bore hole 9, on the outer side of the portion which is opposite to the hot plug 4 is greater than the width of the same bore bead positioned in the other portion. In this case, it is preferable that the width of each bore bead gradually becomes greater from the portion which is adjacent to the bore hole 9 toward the portion on the outer side of the portion which is opposite to the hot plug 4. Generally, each bore bead positioned on the outer side of the portion which is opposite to the hot plug has the increased amount of compression and therefore has increased stress, causing problems such as cracks, setting and the others in a portion which is close to the bore bead. However, setting the large width of the bore bead as mentioned above becomes an effective measure directed toward the prevention of such problems.

In the present embodiment, the case where the beads do not join with each other between the adjacent bore holes has been explained; however, the present invention is also applicable to a type of gasket in which the adjacent beads join with each other.

FIGS. 6(a) to 6(d), FIGS. 7(a) and 7(b) are sectional views (each of which corresponds to the sectional view taken along line II—II of FIG. 1) which illustrate other embodiments, respectively, of the gasket composed of three plates. In these drawings, parts similar to those of the embodiment illustrated by FIGS. 1 to 5 are assigned the same reference numerals.

The embodiments which are illustrated by FIGS. 6(a) to 6(d), respectively, are similar to the embodiment illustrated by FIGS. 1 to 5 in that respective end portions of first bead plates 6, 6A, which end portions respectively face the bore holes, are respectively held by respective folded parts 14 of second bead plates 7, 7A, 7B. However, according to these embodiments, the respective bead plates are different in bead shape. Specifically, in FIG. 6(a), the first bead plate 6 and the second bead plate 7 have the same shape as those of the foregoing embodiment; however, each bore bead 16A of a third bead plate 8A is a convexity positioned upward. In FIG. 6(b), the first bead plate 6 has the same shape as that of the foregoing embodiment; however, respective bore beads 15A, 16B of the second bead plate 7A and a third bead plate 8B are shaped into half beads, respectively.

In a gasket shown in FIG. 6(c), the detail that differs from that of the foregoing embodiment is that its first bead plate is modified in shape. In this embodiment, the first bead plate 6A has hot plug beads 13A each of which has a stepped portion positioned on the right side (in FIG. 6(c)) of the end of the folded part 14 of the second bead plate 7. Thus, in cases (see FIG. 4) where the step is present between the bottom face of each hot plug 4 and the joint sealing face of the cylinder head 2, each hot plug bead which is partially formed with such steps or the like can absorb the step. Moreover, the stopper amount can be set equal to or smaller than the thickness of the first bead plate 6A. Furthermore, with the adoption of each hot plug bead 13A having the stepped portion which is close to the bolt hole, surface pressure occurring on the folded part 14 can be adjusted.

Figure 6:
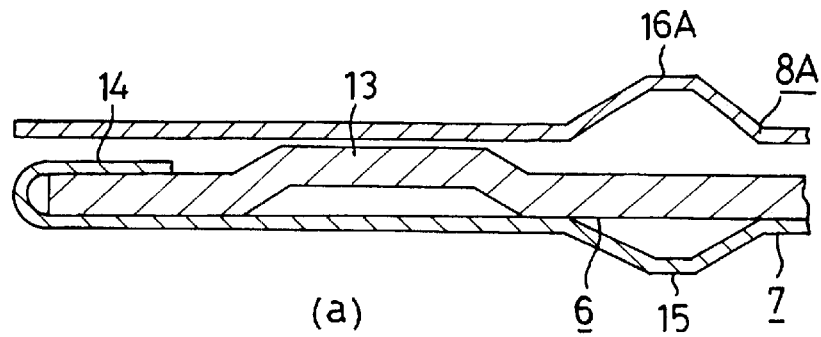
FIGS. 6(a) to 6(d) are sectional views illustrating other embodiments, respectively, in which respective bead plates are different in bead shape.
Figure 6:
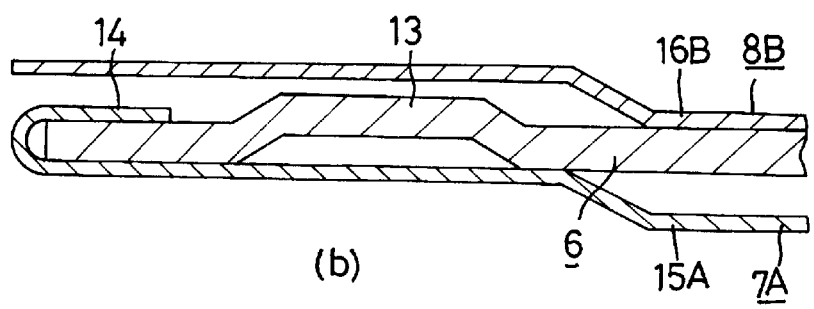
Figure 6:
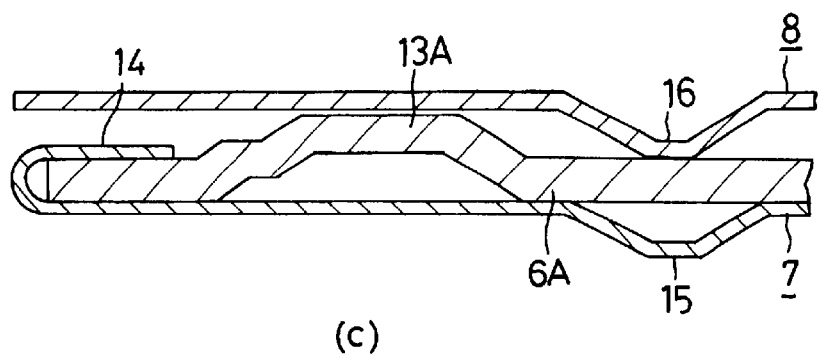
Figure 6:
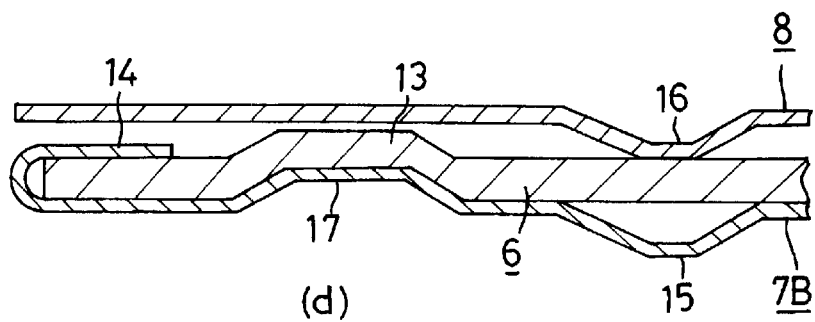

In a gasket shown in FIG. 6(d), the second bead plate 7B is formed with reinforcing beads 17, on which hot plug beads 13 are respectively overlaid. In each of the structures shown in FIG. 6, the relationship between the height of the hot plug bead and the stopper amount is selected in an appropriate manner.

Figure 7:
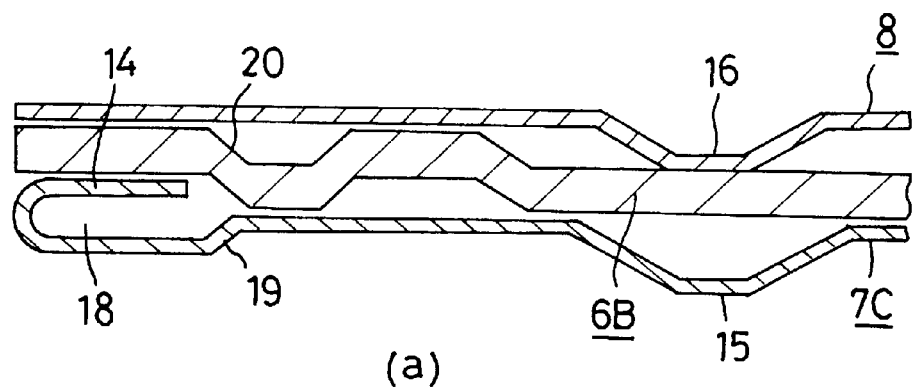
FIGS. 7(a) and 7(b) are sectional views illustrating other embodiments, respectively, in which each first bead plate is not held by folded parts.
Figure 7:
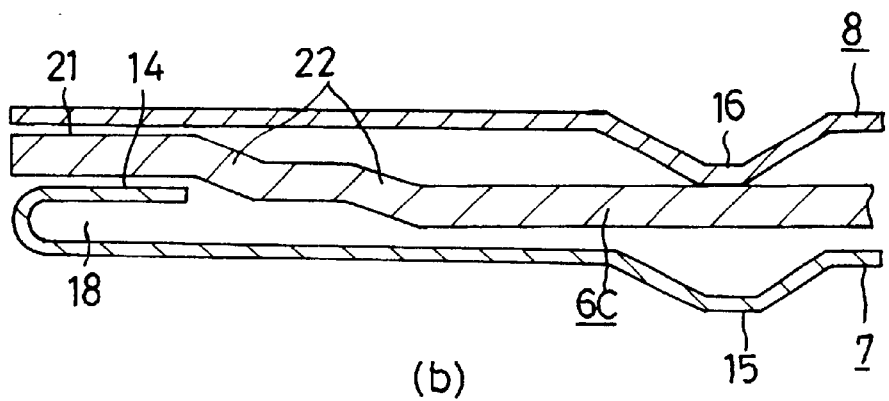

In each of the embodiments which are illustrated by FIGS. 7(a) and 7(b), respectively, the second bead plate is laminated in such a manner that the first bead plate end portions which respectively face the bore holes are not respectively held by the folded parts 14 of the second bead plate, while the inner side of each of the folded parts 14 is provided with a clearance 18. Specifically, in FIG. 7(a), a second bead plate 7C has bent parts 19 each of which is formed in front of the folded part 14 thereof so that the stopper amount of each folded part 14 can be equal to the stopper amount of each bent part 19. Moreover, in FIG. 7(a), half beads 20 are further added to hot plug beads, respectively, of a first bead plate 6B. The embodiment illustrated by FIG. 7(b) has a third bead plate laminated on a gasket shown in FIG. 9(a) (will be described later). Moreover, in FIG. 7(b), a first bead plate 6C is provided with shim parts 21 each of which facilitates the lamination of the relatively thick first bead plate 6C and makes a sealing effect secure about the periphery of the bore hole, and is further provided with double half beads 22. In this case, the half beads 22 each serve as a hot plug bead and help to form the shim parts 21 each of which is laminated on a folded part 14 of a second bead plate 7 for creation of the sealing effect, which folded part 14 has a clearance 18. In each of these embodiments, since the half beads are used, it goes without saying that there is no significant presence of the function of the hot plug beads, and therefore it is better that these embodiments are applied to cases where there is a small step between the sealing contact face and the bottom face of each hot plug 4 which is firmly fitted in the cavity. It should be noted that in cases where the first bead plate end portions which respectively face the bore holes are not respectively held by the folded parts 14 of the second bead plate, as mentioned in these embodiments, curved parts are preferably prevented from cracking, while the clearances 18 are preferably maintained even after the thus-configured gasket is clamped between the cylinder head 2 and the cylinder block 3.

Figure 8:
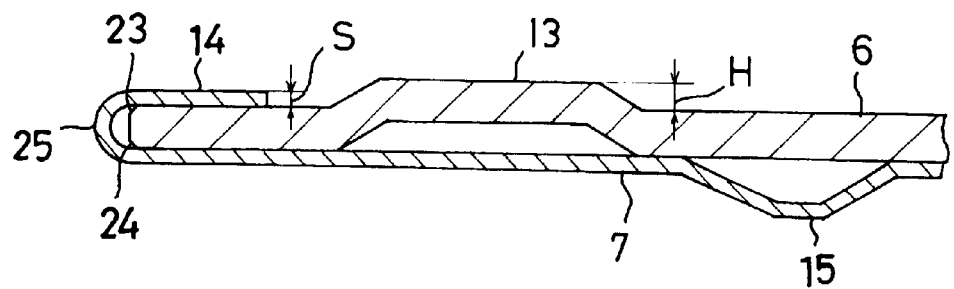
FIG. 8 is a sectional view illustrating an embodiment applicable to a gasket composed of two plates.

In each of the foregoing embodiments, the gasket composed of three plates has been explained; however, the present invention is also applicable to a gasket composed of two plates. FIG. 8 shows a gasket composed of two plates, namely, a first bead plate 6 and a second bead plate 7. It should be noted that parts similar to those of the foregoing embodiments are assigned the same reference numerals.

In this embodiment, each end portion of the first bead plate 6, which end portion faces the bore hole and is held by the second bead plate 7, has chamfered corner portions 23, 24 which extend along the periphery of the bore hole. Thus, cracks resulting from high temperature stress can be prevented from occurring in each folded round part 25 of the second bead plate 7. It should be noted that the chamfering can be carried out separately from or together with the folding operation and is also applicable to the cases where the gasket is composed of three plates.

Even in the gasket composed of such two plates, the second bead plate 7 is partially folded over to form folded parts 14 each of which holds the first bead plate 6. Thus, with the thickness of the second bead plate 7 or with the thickness which is smaller than the thickness of the second bead plate 7, the stopper amount S which is smaller than the height H of each hot plug bead 13 can be secured. Moreover, load occurring during clamping of the gasket can be appropriately concentrated on each folded part 14, so that appropriate high surface pressure occurs on each portion which is close to the bore hole.

Figure 9:
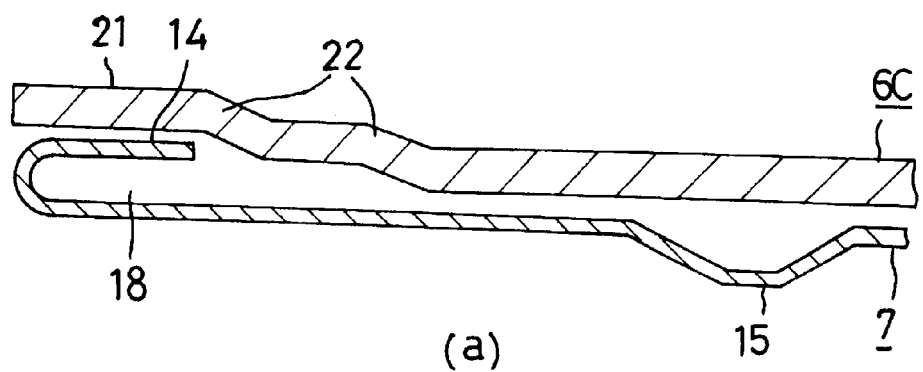
FIGS. 9(a) and 9(b) are sectional views illustrating other embodiments, respectively, of the gasket composed of two plates.
Figure 9:
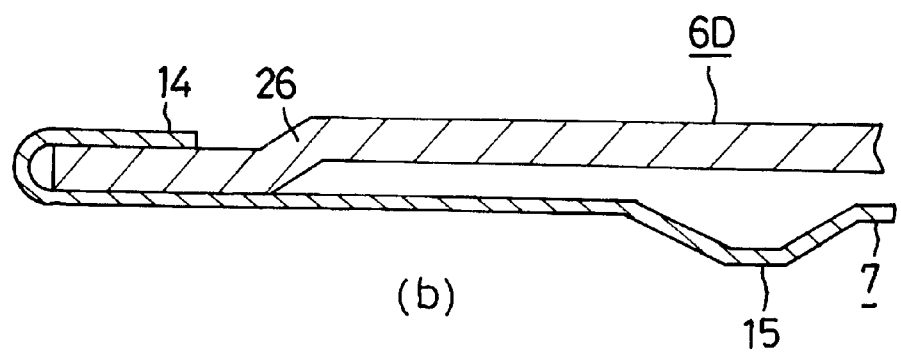
Figure 10:
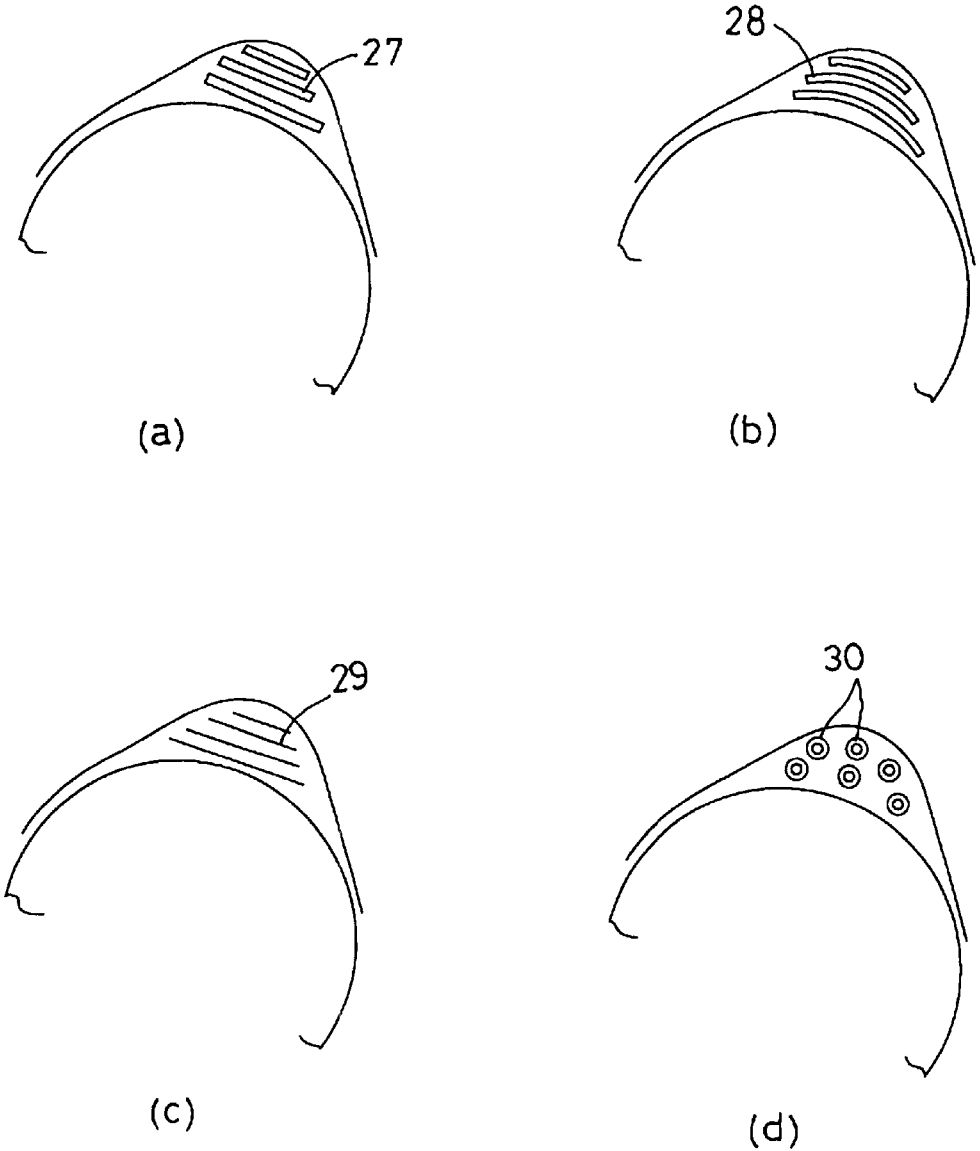
FIGS. 10(a) to 10(b) are modified examples, respectively, of the shape of a hot plug bead.

FIGS. 9(a) and 9(b) illustrate other embodiments, respectively, of the gasket composed of two bead plates.

A gasket shown in FIG. 9(a) meets the gasket shown in FIG. 7(b) except that it has no third bead plate. In FIG. 9(a), a first bead plate 6C is provided with shim parts 21 each of which facilitates the lamination of the relatively thick first bead plate 6C and makes a sealing effect secure about the periphery of the bore hole, and is further provided with double half beads 22. On the other hand, in a gasket shown in FIG. 9(b), each hot plug bead 26 of a first bead plate 6D is opposite in direction to the double half bead 22 of FIG. 9(a) and is shaped into a half bead, while end portions of the first bead plate 6D are respectively held by folded parts 14 of a second bead plate 7.

In each of the foregoing embodiments, the hot plug beads each of which is crescent-shaped in a plan view and is shaped into a convexity whose surface is flat, have been explained; however, other various modified shapes are also available as long as each hot plug bead is integrally formed with the metallic plate. FIGS. 10(a) to 10(d) show those modified shapes. Specifically, FIG. 10(a) to 10(d) illustrate linear beads 27 which are arranged in parallel relation, elliptical beads 28 which are arranged in parallel relation, double half beads 29 and plural beads 30 in the form of small projections, respectively. The shape, the height and the overall structure of each hot plug bead are selected in an appropriate manner in accordance with the step formed between the sealing contact face and the bottom face of the hot plug, required stress dispersion, required surface pressure and the others. However, with consideration given to the simple shape, easy working, effects and the others, it is preferable that, as described in the foregoing embodiments, each hot plug bead is shaped into a convex bead which is crescent-shaped in a plan view.

In each of the foregoing embodiments, the gasket whose second bead plate is disposed on the side of the cylinder block 3 has been explained; however, the gasket can be mounted upside down.

As described above, with the appropriate combination of the basic configuration, which is the first bead plate having the hot plug beads and the second bead plate having the folded parts and the bore beads, and the third bead plate, sealing surface pressure of each of the second and third bead plates is not divided by the first bead plate which is interposed between the second and third bead plates. Thus, a simple layered metallic gasket having excellent sealing performance can be obtained for use in the indirect engine. Moreover, with the adoption of the structure in which the first bead plate is held by the folded parts, the gasket composed of three plates becomes excellent in heat resistance and crack resistance about the periphery of each bore hole. This effect is brought to the fore particularly when the second bead plate formed with the folded parts is made from austenitic high manganese stainless steel.

What is claimed is:

1. A metallic gasket for use in an indirect engine in which hot plugs are fitted in the lower portion of the cylinder head, the metallic gasket comprising:

(a) a first bead plate being made of elastic metal and comprising hot plug beads which are respectively formed opposite the hot plugs; and (b) a second bead plate being made of elastic metal and comprising folded parts each of which is formed about the periphery of a bore hole, and annular bore beads each of which is formed about the periphery of an area including both the bore hole and a portion which is opposite to the hot plug.

2. The metallic gasket as defined in claim 1, wherein end portions of the first bead plate, which end portions respectively face the bore holes, are respectively held by the folded parts formed on the second bead plate.

3. The metallic gasket as defined in claim 2, wherein corner portions of each of the first bead plate end portions held by the second bead plate, which corner portions extend along the periphery of the bore hole, are chamfered.

4. The metallic gasket as defined in claim 1, wherein the first bead plate and the second bead plate are laminated in such a manner that the first bead plate end portions which respectively face the bore holes are not respectively held by the folded parts formed on the second bead plate, while the inner side of each of the folded parts is provided with a clearance.

5. The metallic gasket as defined in any of claims 1 to 4, wherein the second bead plate is made from a spring material having cold workability.

6. The metallic gasket as defined in any of claims 1 to 4, wherein a third bead plate which is made of elastic metal and comprises bore beads is laminated on the first bead plate.

7. The metallic gasket as defined in claim 6, wherein the second bead plate is made from a spring material having cold workability.

8. The metallic gasket as defined in claim 6, wherein the thickness of the first bead plate is set greater than those of the second bead plate and third bead plate.

9. A metal gasket, comprising:
a first bead plate fabricated from a metal material and having a first bead plate bore extending therethrough to define a peripheral edge portion of the first bead plate, the first bead plate including at least one hot plug bead disposed adjacent the first bead plate bore and in a hot plug bead region extending generally arcuately and radially outwardly relative to the peripheral edge portion of the first bead plate; and a second bead plate fabricated from a metal material and having a second bead bore extending therethrough and sized and axially aligned with the first bead plate bore to form a metal gasket bore upon contacting the first bead plate and the second bead plate together in a facially opposing relationship, the second bead plate including a folded part formed at a periphery of the second bead plate which defines the second bead bore and a continuous bead surrounding the metal gasket bore and the at least one hot plug bead in close proximity thereto.

10. A metal gasket according to claim 9, wherein the folded part is bent backwards to extend radially outwardly relative to the gasket bore to define a clearance between the folded part and the second bead plate.

11. A metal gasket according to claim 10, wherein the clearance is sized and adapted to receive at least the peripheral edge portion of the first bead plate.

* * * * *